(12) United States Patent
Wakimoto et al.

(10) Patent No.: US 10,811,668 B2
(45) Date of Patent: Oct. 20, 2020

(54) SECONDARY BATTERY

(71) Applicant: SANYO Electric Co., Ltd., Daito-shi, Osaka (JP)

(72) Inventors: Ryoichi Wakimoto, Hyogo (JP); Naoya Tada, Hyogo (JP); Atsushi Tsuji, Hyogo (JP); Yoshinori Yokoyama, Tokushima (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 167 days.

(21) Appl. No.: 16/177,727

(22) Filed: Nov. 1, 2018

(65) Prior Publication Data
US 2019/0140251 A1 May 9, 2019

(30) Foreign Application Priority Data
Nov. 9, 2017 (JP) .................................. 2017-216107

(51) Int. Cl.
*H01M 2/36* (2006.01)
*H01M 2/34* (2006.01)
*H01M 2/26* (2006.01)
*H01M 2/30* (2006.01)
*H01M 10/0525* (2010.01)

(52) U.S. Cl.
CPC ............. *H01M 2/345* (2013.01); *H01M 2/26* (2013.01); *H01M 2/30* (2013.01); *H01M 2/305* (2013.01); *H01M 10/0525* (2013.01); *H01M 2220/20* (2013.01)

(58) Field of Classification Search
CPC ........ H01M 2/345; H01M 2/26; H01M 2/305; H01M 2/30; H01M 10/0525; H01M 2220/20
See application file for complete search history.

(56) References Cited

U.S. PATENT DOCUMENTS

| | | | |
|---|---|---|---|
| 2009/0148767 A1* | 6/2009 | Yamashita | H01M 2/1241 429/181 |
| 2013/0196185 A1 | 8/2013 | Yokoyama et al. | |
| 2016/0336545 A1 | 11/2016 | Wakimoto et al. | |
| 2016/0336580 A1 | 11/2016 | Wakimoto et al. | |
| 2017/0062866 A1* | 3/2017 | Umeyama | H01M 2/345 |
| 2017/0352846 A1* | 12/2017 | Li | H01M 2/345 |

FOREIGN PATENT DOCUMENTS

JP 2013-157099 A 8/2013

* cited by examiner

*Primary Examiner* — Stephen J Yanchuk
(74) *Attorney, Agent, or Firm* — Westerman, Hattori, Daniels & Adrian, LLP

(57) ABSTRACT

A secondary battery includes an electrode body including a positive electrode plate and a negative electrode plate; a battery case containing the electrode body; a terminal attached to the battery case; a conductive member having an opening adjacent to the electrode body; a deformation plate that seals the opening, and a current collector. The positive electrode plate and a positive electrode terminal are electrically connected to each other via a first positive electrode current collector, the deformation plate, and the conductive member. The first positive electrode current collector has a through-hole. The deformation plate is disposed to face the through-hole. A portion of the first positive electrode current collector distant from the through-hole is welded to the deformation plate to form a weld.

8 Claims, 11 Drawing Sheets

SECONDARY BATTERY

CROSS REFERENCE TO RELATED APPLICATIONS

The present invention application claims priority to Japanese Patent Application No. 2017-216107 filed in the Japan Patent Office on Nov. 9, 2017, the entire contents of which are incorporated herein by reference.

BACKGROUND OF THE INVENTION

Field of the Invention

The present invention relates to a secondary battery.

Description of Related Art

Prismatic secondary batteries, such as alkaline secondary batteries and non-aqueous electrolyte secondary batteries, are used as driving power sources for, for example, electric vehicles (EVs) and hybrid electric vehicles (HEVs, PHEVs).

In such a prismatic secondary battery, a battery case includes a bottomed, cylindrical prismatic outer body having an opening, and a sealing plate that seals the opening. The battery case contains, together with an electrolyte, an electrode body including a positive electrode plate, a negative electrode plate, and a separator. A positive electrode terminal and a negative electrode terminal are attached to the sealing plate. The positive electrode terminal is electrically connected to the positive electrode plate via a positive electrode current collector. The negative electrode terminal is electrically connected to the negative electrode plate via a negative electrode current collector.

Japanese Published Unexamined Patent Application No. 2013-157099 (Patent Document 1) discloses a prismatic secondary battery having a current interrupting mechanism.

When the internal pressure of the battery case reaches a predetermined value or higher due to overcharge or other factors, the current interrupting mechanism operates and disconnects the conduction path between the electrode body and the terminal to interrupt the current.

BRIEF SUMMARY OF THE INVENTION

The installation of a current interrupting mechanism in a secondary battery provides a reliable prismatic secondary battery resistant to overcharge or other factors. However, there is a need to develop a more reliable prismatic secondary battery.

The present invention is directed to a reliable secondary battery.

A secondary battery according to one aspect of the present invention includes:
  an electrode body including a positive electrode plate and a negative electrode plate;
  a battery case containing the electrode body;
  a terminal attached to the battery case;
  a conductive member having an opening adjacent to the electrode body;
  a deformation plate that seals the opening; and
  a current collector,
wherein
  the positive electrode plate or the negative electrode plate is electrically connected to the terminal via the current collector, the deformation plate, and the conductive member,
  the current collector has a through-hole,
  the deformation plate is disposed to face the through-hole,
  a portion of the current collector distant from the through-hole is welded to the deformation plate to form a weld, and
  the deformation plate deforms when an internal pressure of the battery case reaches a predetermined value or higher, and the deformation of the deformation plate causes electrical disconnection between the positive electrode plate or the negative electrode plate and the terminal.

The provision of the through-hole near a portion of the current collector connected to the deformation plate increases and stabilizes the flatness of the surface of the current collector connected to the deformation plate. When the surface of the current collector connected to the deformation plate has high and stable flatness, it is difficult to generate a gap during welding between the deformation plate and the current collector, and a reliable weld is stably formed accordingly. Penetration welding can be stably carried out by welding, to the deformation plate, a portion of the current collector distant from the through-hole provided in the current collector. If the periphery of the through-hole in the current collector is welded to the deformation plate by means of energy irradiation, the diffuse reflection of energy rays may damage surrounding components. Moreover, the welding condition may not be stable. These issues can be solved effectively by weld-connecting, to the deformation plate, a portion of the current collector distant from the through-hole provided in the current collector.

The weld penetrates the current collector and is connected to the deformation plate. Preferably, the weld does not penetrate the deformation plate.

Such a configuration can assuredly avoid generation of a leaking portion in the deformation plate. As a result, the sealability of the secondary battery can be ensured certainly.

Preferably, the deformation plate has a thick portion, which has a larger thickness than the surrounding area, in a central part, and the current collector is welded to the thick portion to form the weld.

Such a configuration can effectively avoid formation of the weld in the entire region in the thickness direction of the deformation plate. This provides a reliable secondary battery with certainly ensured sealability.

Preferably, the deformation plate has a protrusion, which protrudes toward the electrode body, in a central part, and the thick portion includes the protrusion.

With such a configuration, the current collector is in close contact with the deformation plate certainly during welding between the current collector and the deformation plate. This provides a secondary battery having a reliable weld.

As the weld is viewed in the direction perpendicular to the deformation plate, the weld has a substantially annular shape. The weld having a substantially annular shape is preferably located so as to surround the through-hole.

Such a configuration provides a reliable secondary battery in which the current collector and the deformation plate are strongly connected to each other. When the internal pressure of the battery case increases and the deformation plate deforms upon application of the pressure on the deformation plate, the stress can assuredly act on a fracture-expected part (fragile part) provided in the current collector.

Here, the substantially annular shape includes an annular shape and a partially cut annular shape. For example, the annular shape may be an annular shape with a cut or cuts. Provided that the length of the perimeter of the annular shape is 100, the total length of parts that are not cut out is preferably 70 or more, more preferably 80 or more, and still more preferably 90 or more.

Preferably, the weld having a substantially annular shape includes two substantially annular welds that are adjacent in the radial direction of the deformation plate.

Such a configuration provides a reliable secondary battery in which the current collector and the deformation plate are strongly connected to each other.

As the weld is viewed in the direction perpendicular to the deformation plate, the weld preferably has a zig-zag pattern. Such a configuration provides a reliable secondary battery in which the current collector and the deformation plate are strongly connected to each other.

The deformation plate has an annular first groove on its surface adjacent to the electrode body and an annular second groove on its surface adjacent to the terminal. In the radial direction of the deformation plate, at least part of the first groove is preferably located outward of the second groove. In the radial direction of the deformation plate, the width of the second groove is preferably larger than the width of the first groove.

Such a configuration can suppress an increase in the electrical resistance of the deformation plate and enables the deformation plate to deform easily. This provides a secondary battery having a low internal resistance and including a current interrupting mechanism that operates immediately when the secondary battery is overcharged.

The depth of the first groove is preferably larger than the depth of the second groove. Such a configuration enables the deformation plate to deform easily.

The first groove includes a bottom, a first side wall, and a second side wall.

The first side wall is located nearer to the center of the deformation plate than the second side wall.

The angle of the second side wall to the bottom is preferably larger than the angle of the first side wall to the bottom.

Such a configuration can reduce process variations in deformation plate and stabilizes ease of deformation of the deformation plate. This provides a current interrupting mechanism that operates assuredly when the internal pressure of the battery case reaches a predetermined value or higher.

The deformation plate preferably has a tapered portion at its periphery that is an edge adjacent to the terminal. Such a configuration can effectively avoid damage to the conductive member when the deformation plate is inserted into the opening of the conductive member. Therefore, the leakage at the connection part between the conductive member and the deformation plate can be avoided assuredly.

The terminal and the conductive member may be integrally formed as one component. The terminal and the conductive member may be separate components.

The present invention can provide a reliable secondary battery.

DETAILED DESCRIPTION OF THE INVENTION

The structure of a prismatic secondary battery 20, which is a secondary battery according to an embodiment, will be described below. The present invention is not limited to the following embodiment.

Figure 1:
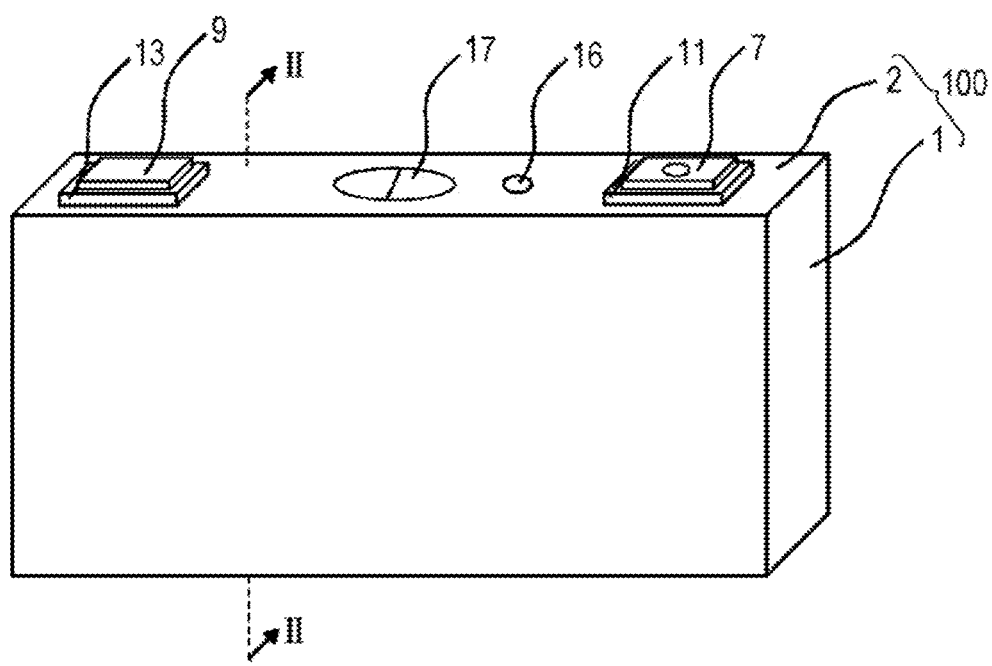
FIG. 1 is a perspective view of a secondary battery according to an embodiment.
Figure 2:
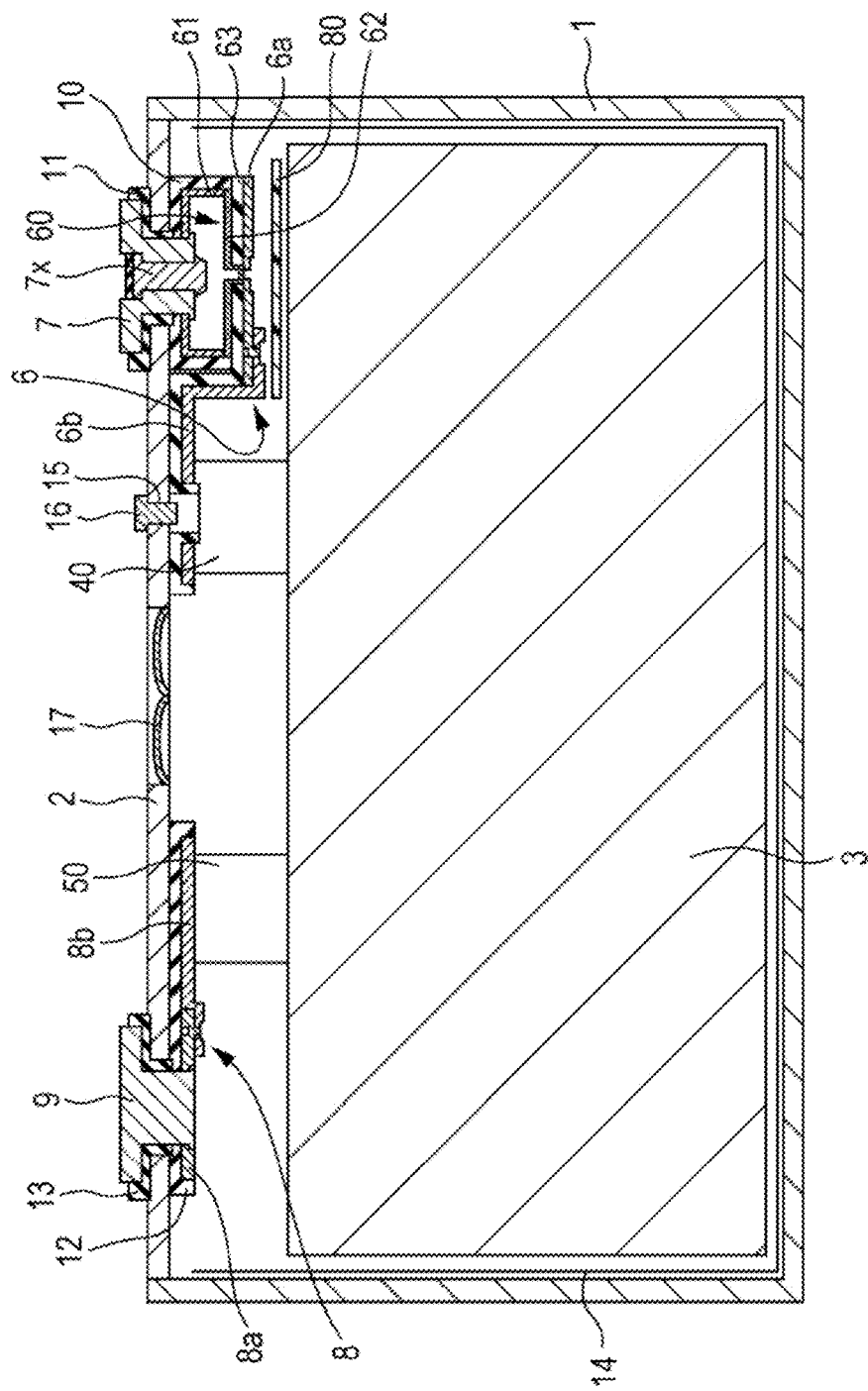
FIG. 2 is a sectional view taken along line II-II in FIG. 1.

As illustrated in FIG. 1 and FIG. 2, the prismatic secondary battery 20 has a battery case 100. The battery case 100 includes a bottomed, cylindrical prismatic outer body 1 having an opening, and a sealing plate 2 that seals the opening of the prismatic outer body 1. The prismatic outer body 1 and the sealing plate 2 are preferably each made of metal, and preferably made of, for example, aluminum or an aluminum alloy. The prismatic outer body 1 contains, together with an electrolyte, an electrode body 3 including a positive electrode plate and a negative electrode plate that are stacked with a separator interposed therebetween. An insulating sheet 14 made of resin is disposed between the electrode body 3 and the prismatic outer body 1.

A positive electrode tab 40 and a negative electrode tab 50 are disposed at the edge of the electrode body 3 adjacent to the sealing plate 2. The positive electrode tab 40 is electrically connected to a positive electrode terminal 7 via a second positive electrode current collector 6b and a first positive electrode current collector 6a. The negative electrode tab 50 is electrically connected to a negative electrode terminal 9 via a second negative electrode current collector 8b and a first negative electrode current collector 8a. The first positive electrode current collector 6a and the second positive electrode current collector 6b constitute a positive electrode current collector 6. The first negative electrode current collector 8a and the second negative electrode current collector 8*b* constitute a negative electrode current collector 8. The positive electrode current collector 6 may be composed of one component. The negative electrode current collector 8 may be composed of one component.

The positive electrode terminal 7 is attached to the sealing plate 2 via an external insulating member 11 made of resin. The negative electrode terminal 9 is attached to the sealing plate 2 via an external insulating member 13 made of resin. The positive electrode terminal 7 is preferably made of metal, and more preferably made of aluminum or an aluminum alloy. The negative electrode terminal 9 is preferably made of metal, and more preferably made of copper or a copper alloy. The negative electrode terminal 9 may have a section made of aluminum or an aluminum alloy and a section made of copper or a copper alloy. In this case, the section made of copper or a copper alloy is preferably connected to the negative electrode current collector 8.

The conduction path between the positive electrode plate and the positive electrode terminal 7 is provided with a current interrupting mechanism 60. The current interrupting mechanism 60 operates so as to interrupt the conduction path between the positive electrode plate and the positive electrode terminal 7 when the internal pressure of the battery case 100 reaches a predetermined value or higher. The conduction path between the negative electrode plate and the negative electrode terminal 9 may be provided with a current interrupting mechanism.

The sealing plate 2 has a gas release valve 17. The gas release valve 17 fractures when the internal pressure of the battery case 100 reaches a predetermined value or higher and releases gas in the battery case 100 to the outside of the battery case 100. The operating pressure of the gas release valve 17 is set to a value larger than the operating pressure of the current interrupting mechanism 60.

The sealing plate 2 has an electrolyte injection port 15. After the electrolyte is injected into the battery case 100 through the electrolyte injection port 15, the electrolyte injection port 15 is sealed with a sealing plug 16. The sealing plug 16 is preferably a blind rivet.

Next, a method for producing the prismatic secondary battery 20, and the components of the prismatic secondary battery 20 will be described below in detail.

Production of Positive Electrode Plate

A positive electrode slurry containing a lithium-nickel-cobalt-manganese composite oxide as a positive electrode active material, polyvinylidene fluoride (PVdF) as a binder, a carbon material as a conductive agent, and N-methyl-2-pyrrolidone (NMP) as a dispersion medium is prepared. The positive electrode slurry is applied to each surface of an aluminum foil. The aluminum foil has a rectangular shape and a thickness of 15 µm and functions as a positive electrode core. The aluminum foil with the positive electrode slurry is dried to remove NMP in the positive electrode slurry, whereby a positive electrode active material mixture layer is formed on the positive electrode core. The positive electrode active material mixture layer is then pressed into a predetermined thickness. The resulting positive electrode plate is cut into a predetermined shape. The positive electrode active material mixture layer preferably contains lithium carbonate and lithium phosphate.

Figure 3:
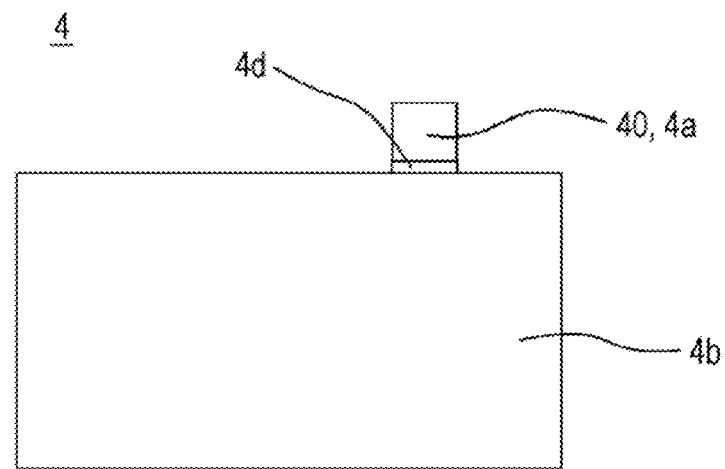
FIG. 3 is a plan view of a positive electrode plate according to the embodiment.

FIG. 3 is a plan view of the positive electrode plate 4 prepared by using the above-described method. As illustrated in FIG. 3, the positive electrode plate 4 has a body having a positive electrode active material mixture layer 4*b* on each surface of a rectangular positive electrode core 4*a*. The positive electrode core 4*a* projects from the edge of the body, and the projecting positive electrode core 4*a* constitutes the positive electrode tab 40. The positive electrode tab 40 may be a part of the positive electrode core 4*a* as illustrated in FIG. 3, or another member may be connected to the positive electrode core 4*a* to form the positive electrode tab 40. Preferably, a part of the positive electrode tab 40 adjacent to the positive electrode active material mixture layer 4*b* has a positive electrode protective layer 4*d*. The positive electrode protective layer 4*d* has a larger electrical resistance than the positive electrode active material mixture layer 4*b*.

Production of Negative Electrode Plate

A negative electrode slurry containing graphite as a negative electrode active material, a styrene-butadiene rubber (SBR) as a binder, carboxymethylcellulose (CMC) as a thickener, and water is prepared. The negative electrode slurry is applied to each surface of a copper foil. The copper foil has a rectangular shape and a thickness of 8 µm and functions as a negative electrode core. The copper foil with the negative electrode slurry is dried to remove water in the negative electrode slurry, whereby a negative electrode active material mixture layer is formed on the negative electrode core. The negative electrode active material mixture layer is then pressed into a predetermined thickness. The resulting negative electrode plate is cut into a predetermined shape.

Figure 4:
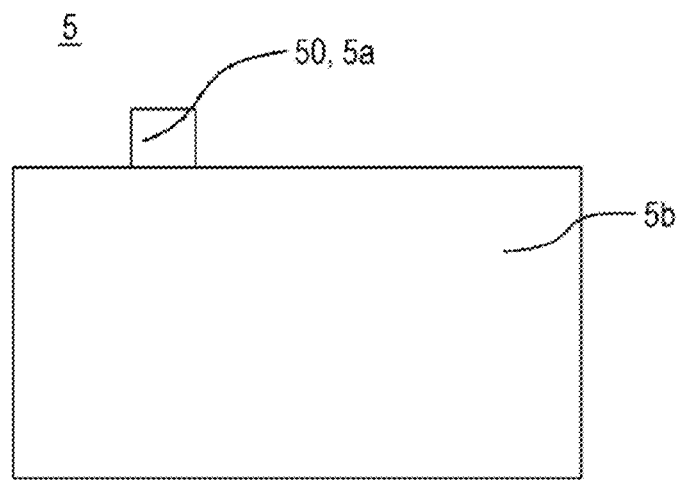
FIG. 4 is a plan view of a negative electrode plate according to the embodiment.

FIG. 4 is a plan view of a negative electrode plate 5 prepared by using the above-described method. As illustrated in FIG. 4, the negative electrode plate 5 has a body having a negative electrode active material mixture layer 5*b* on each surface of a rectangular negative electrode core 5*a*. The negative electrode core 5*a* projects from the edge of the body, and the projecting negative electrode core 5*a* constitutes the negative electrode tab 50. The negative electrode tab 50 may be a part of the negative electrode core 5*a* as illustrated in FIG. 4, or another member may be connected to the negative electrode core 5*a* to form the negative electrode tab 50.

Production of Electrode Body Element

Stacked electrode body elements (3*a*, 3*b*) are produced as follows: preparing 50 positive electrode plates 4 and 51 negative electrode plates 5 by using the foregoing methods; and stacking the positive electrode plates 4 and the negative electrode plates 5 with rectangular polyolefin separators each interposed therebetween.

Figure 5:
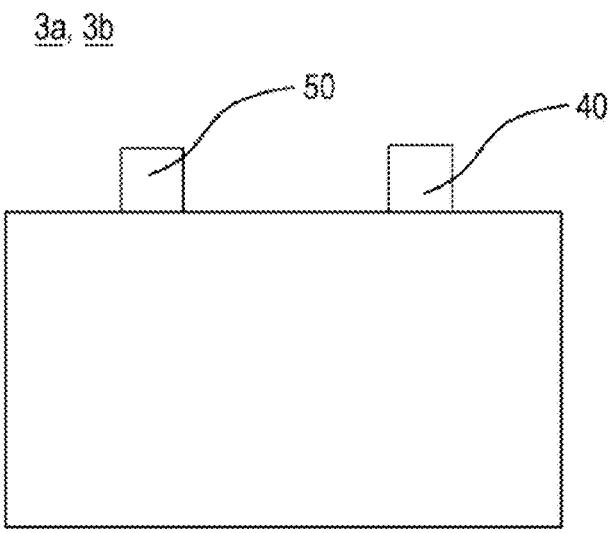
FIG. 5 is a plan view of an electrode body element according to the embodiment.

As illustrated in FIG. 5, the stacked electrode body element (the first electrode body element 3*a*, the second electrode body element 3*b*) has a positive electrode tab group (a first positive electrode tab group 40*a*, a second positive electrode tab group 40*b*) and a negative electrode tab group (a first negative electrode tab group 50*a*, a second negative electrode tab group 50*b*) on one edge. The positive electrode tab group includes the positive electrode tabs 40 of the positive electrode plates 4 stacked on top of one another, and the negative electrode tab group includes the negative electrode tabs 50 of the negative electrode plates 5 stacked on top of one another. The separator is located on each outer surface of the electrode body element, and a tape or the like is used to fix the electrode plates and the separators such that they are stacked on top of one another. Alternatively, the separators may each have adhesive layers so that the separators adhere to the respective positive electrode plates 4 and the separators adhere to the respective negative electrode plates 5.

Preferably, the separators have the same size as the negative electrode plates 5 or have a larger size than the negative electrode plates 5 in a plan view. The positive electrode plate 4 and the negative electrode plate 5 may be stacked on top of each other after the peripheries of two separators between which the positive electrode plate 4 or the negative electrode plate 5 is interposed are hot melted. Alternatively, a wound electrode body element may be provided by winding a strip-shaped positive electrode plate and a strip-shaped negative electrode plate with a strip-shaped separator interposed therebetween.

Attachment of Components to Sealing Plate (Positive Electrode Side)

Figure 6:
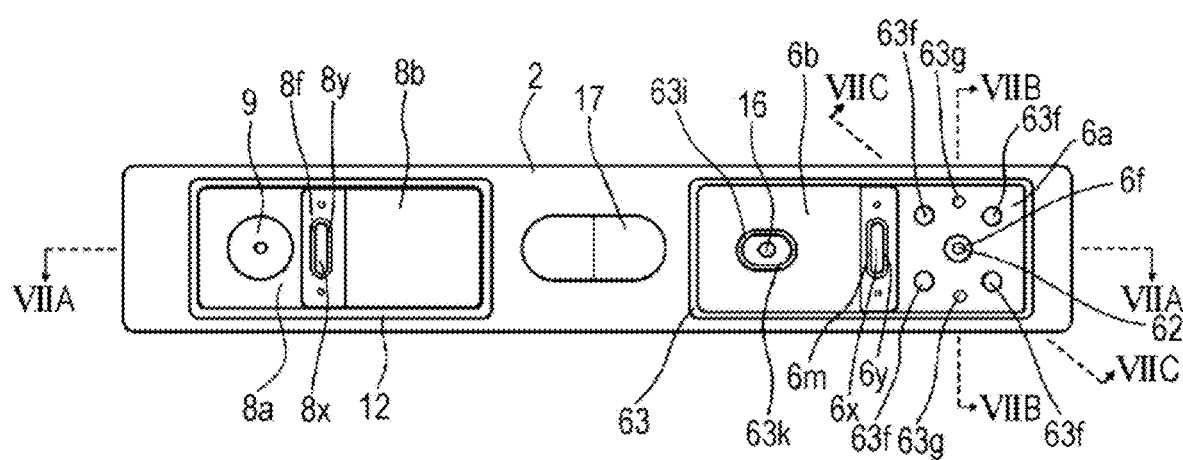
FIG. 6 is a bottom view of a sealing plate to which each component is attached.

A method for attaching the positive electrode terminal 7, the first positive electrode current collector 6a, and other components to the sealing plate 2, and the structure of the positive electrode terminal 7 and its surrounding area will be described by way of FIG. 2, FIG. 6, and FIGS. 7A to 7C. In FIG. 6, the positive electrode tab 40 and the negative electrode tab 50 are not illustrated.

The external insulating member 11 is disposed on the battery outer surface side of the sealing plate 2 and near a positive electrode terminal attachment hole 2a, and a first insulating member 10 and a conductive member 61 are disposed on the battery inner surface side of the sealing plate 2 and near the positive electrode terminal attachment hole 2a. Next, an insertion portion 7b on one side of a flange 7a in the positive electrode terminal 7 is inserted into the through-hole of the external insulating member 11, the positive electrode terminal attachment hole 2a of the sealing plate 2, the through-hole of the first insulating member 10, and the through-hole of the conductive member 61. The end of the insertion portion 7b is crimped onto the conductive member 61. The positive electrode terminal 7, the external insulating member 11, the sealing plate 2, the first insulating member 10, and the conductive member 61 are fixed accordingly. When the insertion portion 7b of the positive electrode terminal 7 is crimped, a terminal increased-diameter portion 7c, which has an outer diameter larger than the inner diameter of the through-hole of the conductive member 61, is formed on the end side of the insertion portion 7b. The terminal increased-diameter portion 7c of the positive electrode terminal 7 is preferably welded to the conductive member 61 by means of irradiation with energy rays. The first insulating member 10 is preferably made of resin.

Figure 7A:
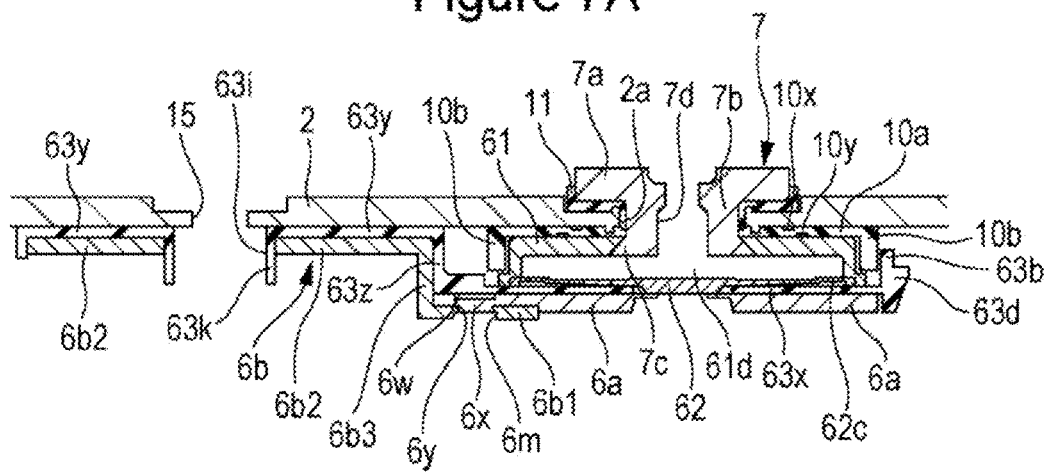
FIG. 7A is a sectional view taken along line VIIA-VIIA in FIG. 6.
Figure 7B:
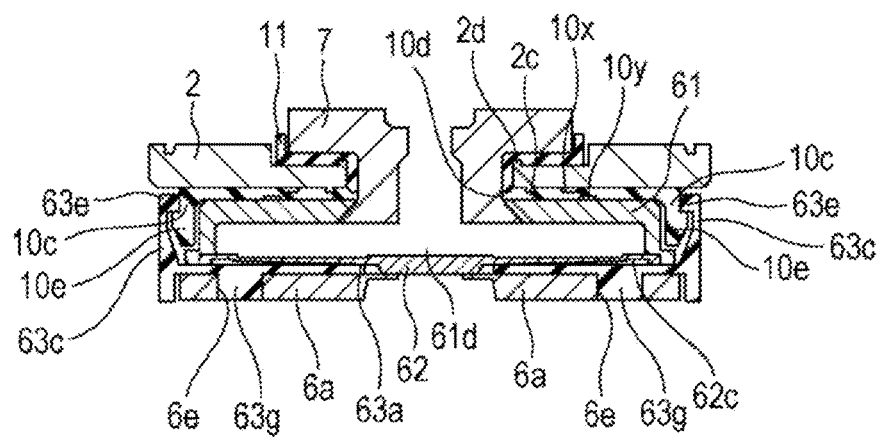
FIG. 7B is a sectional view taken along line VIIB-VIIB in FIG. 6.

As illustrated in FIG. 7A, the first insulating member 10 has a first insulating member body 10a disposed to face the sealing plate 2. First side walls 10b in a pair are respectively disposed at the opposed ends of the first insulating member body 10a in the longitudinal direction of the sealing plate 2. As illustrated in FIG. 7B, second side walls 10c in a pair are respectively disposed at the opposed ends of the first insulating member body 10a in the transverse direction of the sealing plate 2. A first connection part 10e is disposed on the outer surface side of the second side wall 10c. The first connection part 10e is preferably disposed in a central part of the second side wall 10c in the longitudinal direction of the sealing plate 2. Second connection parts 10f are preferably disposed on the outer surface side of the second side wall 10c (see FIG. 13A). The second connection parts 10f are preferably disposed at the edges of the second side wall 10c in the longitudinal direction of the sealing plate 2.

An insulating member first groove 10x is disposed on the surface of the first insulating member body 10a adjacent to the sealing plate 2. An insulating member second groove 10y is disposed on the surface of the first insulating member body 10a adjacent to the conductive member 61. The insulating member second groove 10y is located radially outward of the insulating member first groove 10x. Recesses 10g are provided at four corners of the surface of the first insulating member body 10a adjacent to the sealing plate 2.

The insulating member first groove 10x and the insulating member second groove 10y preferably each have an annular shape in a plan view.

Figure 7C:
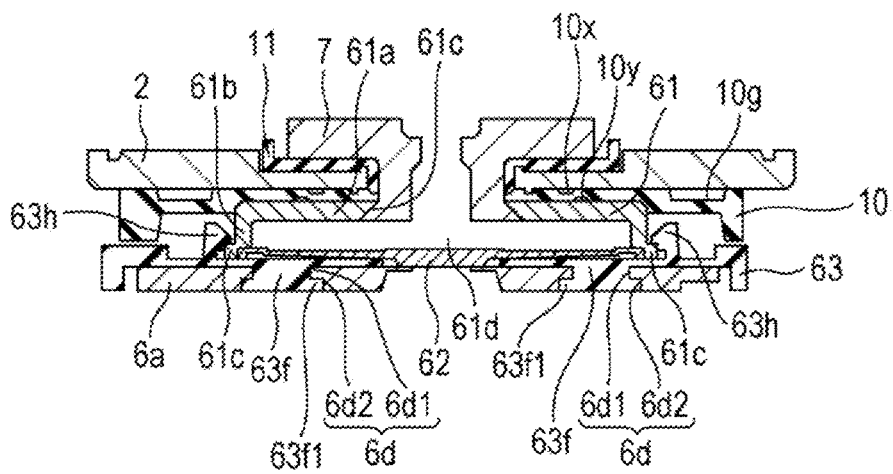
FIG. 7C is a sectional view taken along line VIIC-VIIC in FIG. 6.

As illustrated in FIG. 7A to FIG. 7C, the conductive member 61 has a conductive member base portion 61a and a tubular portion 61b. The conductive member base portion 61a is disposed to face the first insulating member body 10a, and the tubular portion 61b extends from the edge of the conductive member base portion 61a toward the electrode body 3. The shape of the cross section of the tubular portion 61b parallel to the sealing plate 2 may be circular or may be rectangular. The end of the tubular portion 61b adjacent to the electrode body 3 has a flange portion 61c. The end of the tubular portion 61b adjacent to the electrode body 3 is connected to a conductive member opening 61d.

Next, the deformation plate 62 is placed so as to close the conductive member opening 61d of the conductive member 61, and the periphery of the deformation plate 62 is welded to the conductive member 61 by means of laser welding or like. The conductive member opening 61d of the conductive member 61 is thus sealed with the deformation plate 62 accordingly. The conductive member 61 and the deformation plate 62 are preferably each made of metal, and more preferably made of aluminum or an aluminum alloy.

Figure 8A:
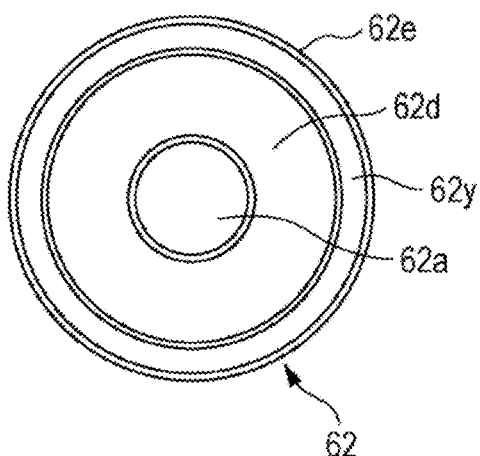
FIG. 8A is a top view of a deformation plate.
Figure 8B:
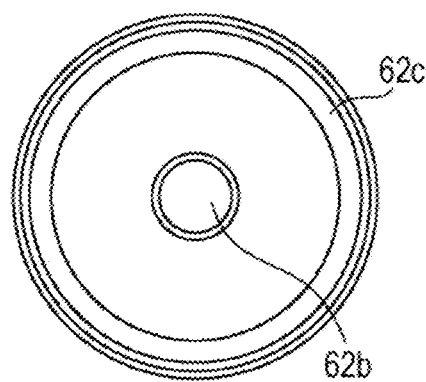
FIG. 8B is a bottom view of the deformation plate.
Figure 8C:
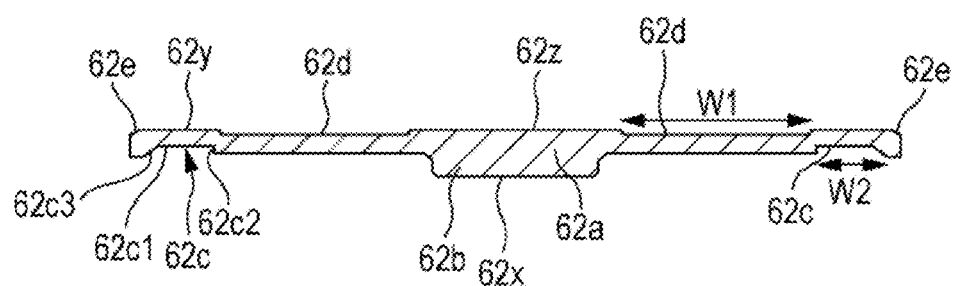
FIG. 8C is a sectional view of the deformation plate.

FIG. 8A is a top view of the deformation plate 62 (a view illustrating the surface adjacent to the positive electrode terminal 7). FIG. 8B is a bottom view of the deformation plate 62 (a view illustrating the surface adjacent to the electrode body 3). FIG. 8C is a sectional view of the deformation plate 62 where the cross section radially extends through the center of the deformation plate 62. The deformation plate 62 has a thick portion 62a, which has a larger thickness than the surrounding area, in a central part. The thick portion 62a includes a protrusion 62b, which protrudes toward the electrode body 3.

The deformation plate 62 has a first groove 62c on its surface adjacent to the electrode body 3. The first groove 62c is preferably formed near the periphery of the deformation plate 62. Provided that the radius of the deformation plate 62 is r, the first groove 62c is preferably formed in a region located radially outward of the position that is ⅔r away from the center of the deformation plate 62 toward the periphery. The first groove 62c preferably has a substantially annular shape (including an annular shape or a partially missing annular shape) in a plan view. The deformation plate 62 has a second groove 62d on its surface adjacent to the positive electrode terminal 7 (namely, adjacent to the sealing plate 2).

In the radial direction of the deformation plate 62, the first groove 62c is located radially outward of the second groove 62d. When the entire first groove 62c is located radially outward of the second groove 62d in the radial direction of the deformation plate 62, it is possible to effectively suppress an increase in the electrical resistance of the deformation plate. In the radial direction of the deformation plate 62, the width W2 of the second groove 62d is preferably larger than the width W1 of the first groove 62c. The depth of the first groove 62c is preferably larger than the depth of the second groove 62d. The edge of the periphery of the deformation plate 62 adjacent to the positive electrode terminal 7 (namely, adjacent to the sealing plate 2) is preferably provided with a tapered portion 62e.

Figure 9A:
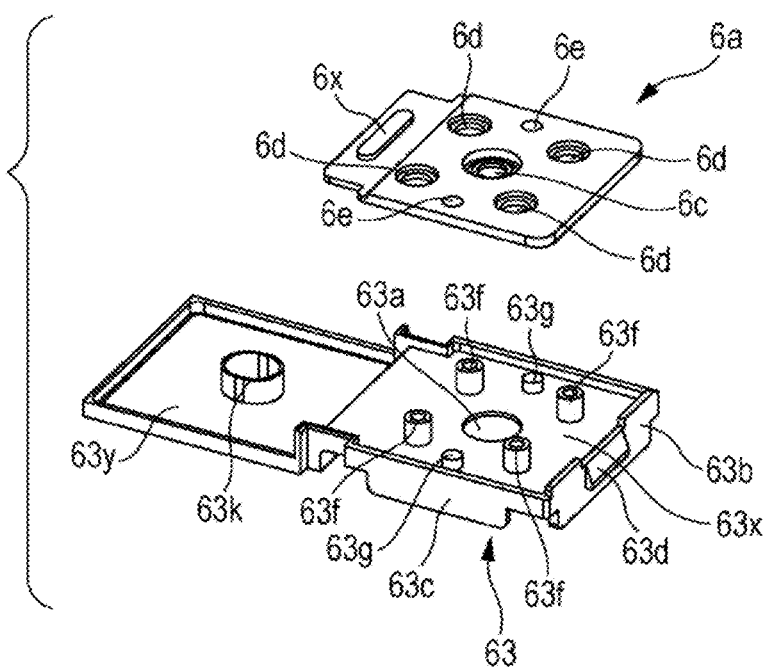
FIG. 9A is a perspective view of a first positive electrode current collector and a second insulating member before they are attached to each other.
Figure 9B:
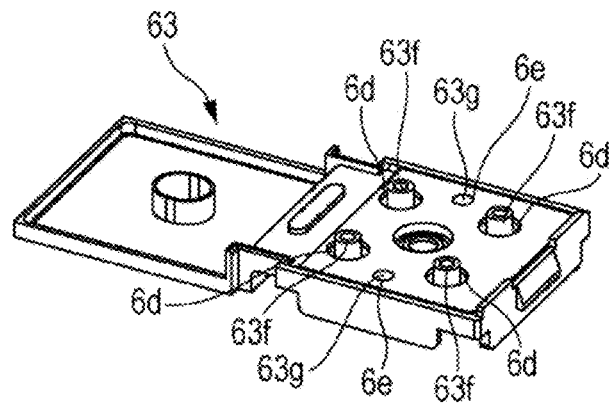
FIG. 9B is a perspective view of the first positive electrode current collector and the second insulating member after they are attached to each other.
Figure 9C:
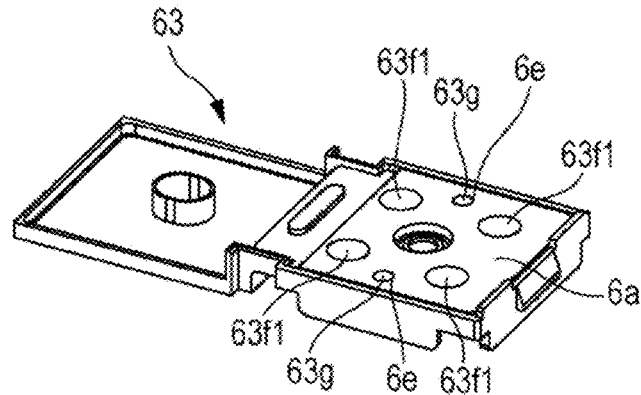
FIG. 9C is a perspective view of the first positive electrode current collector and the second insulating member after they are fixed to each other.

Next, a method for fixing the second insulating member 63 and the first positive electrode current collector 6a to each other will be described by way of FIG. 9A to FIG. 9C. In FIG. 9A to FIG. 9C, the surface adjacent to the electrode body 3 in the prismatic secondary battery 20 is located at an upper position, and the surface adjacent to the sealing plate 2 is located at a lower position.

As illustrated in FIG. 9A, the first positive electrode current collector 6a has a through-hole 6c. The first positive electrode current collector 6a has four fixation holes 6d around the through-hole 6c. The first positive electrode current collector 6a may have one fixation hole 6d but preferably has two or more fixation holes 6d. The first positive electrode current collector 6a has anti-displacement holes 6e around the through-hole 6c. The first positive electrode current collector 6a may have one anti-displacement hole 6e but preferably has at least two anti-displacement holes 6e. Each anti-displacement hole 6e is preferably disposed between the fixation hole 6d and the fixation hole 6d. Each fixation hole 6d preferably has a small-diameter part 6d1 and a large-diameter part 6d2, which has a larger inner diameter than the small-diameter part 6d1. The large-diameter part 6d2 is preferably located nearer to the electrode body 3 than the small-diameter part 6d1.

As illustrated in FIG. 7A to FIG. 7C, the second insulating member 63 includes an insulating member first region 63x disposed to face the deformation plate 62, an insulating member second region 63y disposed to face the sealing plate 2, and an insulating member third region 63z, which connects the insulating member first region 63x and the insulating member second region 63y. The insulating member first region 63x has an insulating member first opening 63a at its center. The insulating member first region 63x has a third wall 63b at its end in the longitudinal direction of the sealing plate 2. The third wall 63b has a third connection part 63d. The insulating member first region 63x has fourth walls 63c at the opposed ends in the transverse direction the sealing plate 2. The fourth walls 63c each have a fourth connection part 63e. The insulating member first region 63x has four fixation protrusions 63f on its surface adjacent to the electrode body 3. The insulating member first region 63x also has two anti-displacement protrusions 63g. The insulating member first region 63x has four claw portions 63h on its surface adjacent to the sealing plate 2. The insulating member second region 63y is located nearer to the sealing plate 2 than the insulating member first region 63x. The insulating member second region 63y has an insulating member second opening 63i at a position opposed to the electrolyte injection port 15 formed in the sealing plate 2. An insulating member annular rib 63k, which extends toward the electrode body 3, is disposed on the periphery of the insulating member second opening 63i.

As illustrated in FIG. 9B, the first positive electrode current collector 6a is disposed on the second insulating member 63 such that the fixation protrusions 63f of the second insulating member 63 are placed in the corresponding fixation holes 6d of the first positive electrode current collector 6a, and the anti-displacement protrusions 63g of the second insulating member 63 are placed in the corresponding anti-displacement holes 6e of the first positive electrode current collector 6a. The ends of the fixation protrusions 63f of the second insulating member 63 are then deformed by means of hot crimping or the like. As a result, as illustrated in FIG. 7C and FIG. 9C, the increased-diameter portions 63f1 are formed at the ends of the fixation protrusions 63f of the second insulating member 63, and the second insulating member 63 and the first positive electrode current collector 6a are fixed to each other. Such a configuration can avoid application of a load on fragile parts, such as a thin portion 6f and a notch 6g, of the first positive electrode current collector 6a if a strong impact or vibration acts on the prismatic secondary battery 20.

As illustrated in FIG. 7C, the increased-diameter portions 63f1 at the ends of the fixation protrusions 63f of the second insulating member 63 are preferably located in the large-diameter parts 6d2 of the fixation holes 6d.

The anti-displacement protrusions 63g of the second insulating member 63 are not hot-crimped unlike the fixation protrusions 63f and have no increased-diameter portion at their ends.

The fixation protrusions 63f preferably have a larger outer diameter than the anti-displacement protrusions 63g. The small-diameter parts 6d1 of the fixation holes 6d of the first positive electrode current collector 6a preferably have a larger inner diameter than the anti-displacement holes 6e of the first positive electrode current collector 6a.

Next, as illustrated in FIG. 7A to FIG. 7C, the second insulating member 63 to which the first positive electrode current collector 6a has been fixed is connected to the first insulating member 10 and the conductive member 61.

As illustrated in FIG. 7B, the fourth connection part 63e of the second insulating member 63 is connected to the first connection part 10e of the first insulating member 10. As illustrated in FIG. 7C, the claw portion 63h of the second insulating member 63 is connected to the flange portion 61c of the conductive member 61. The second insulating member 63 is accordingly connected to both the first insulating member 10 and the conductive member 61. The second insulating member 63 is not necessarily connected to both the first insulating member 10 and the conductive member 61. However, the second insulating member 63 is preferably connected to at least one of the first insulating member 10 and the conductive member 61. Such a configuration can avoid application of a load on fragile parts of the first positive electrode current collector 6a even if a strong impact or vibration acts on the prismatic secondary battery 20. As a result, the fragile parts of the first positive electrode current collector 6a are unlikely to be damaged or broken.

Figure 10:
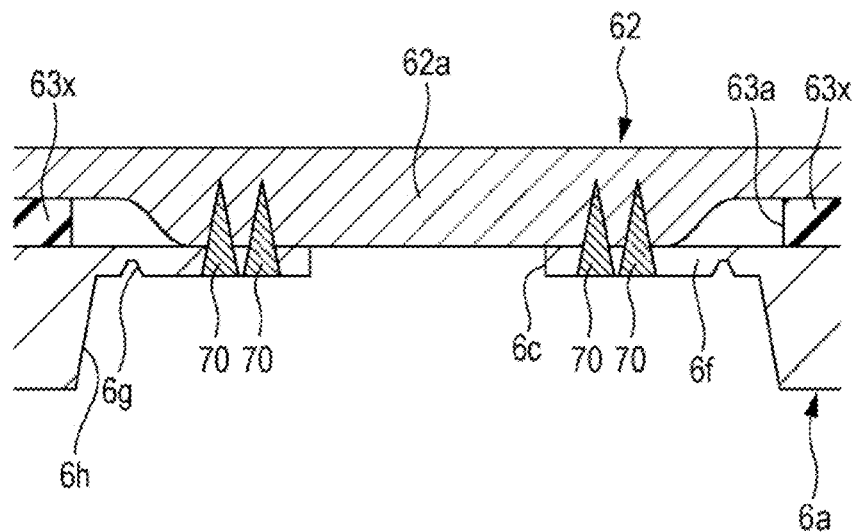
FIG. 10 is a sectional view at and near the connection part between the deformation plate and the first positive electrode current collector.

The deformation plate 62 is weld-connected to the first positive electrode current collector 6a. FIG. 10 is an enlarged view at and near the connection part between the deformation plate 62 and the first positive electrode current collector 6a in FIG. 7A. The first positive electrode current collector 6a has the through-hole 6c. The through-hole 6c is formed at the center of the thin portion 6f The thin portion 6f preferably has an annular notch 6g, which is formed so as to surround the through-hole 6c.

The surrounding area of the through-hole 6c of the first positive electrode current collector 6a is disposed in contact with the thick portion 62a at the center of the deformation plate 62. Then, penetration welding is performed by irradiating the surrounding area of the through-hole 6c with an energy ray to form a weld 70.

The weld 70 is a weld nugget that penetrates the first positive electrode current collector 6a and that is connected to the thick portion 62a of the deformation plate 62. The weld 70 preferably has an annular shape in a plan view. The shape of the weld 70 in a plan view may be a partially missing annular shape. Plural welds 70 distant from each other may be formed.

Preferably, the shape of the weld 70 in a plan view is an annular shape or a partially missing annular shape, and the weld 70 includes two substantially annular welds that are adjacent in the radial direction of the deformation plate 62. For example, the shape of the weld 70 in a plan view may be a double circle shape.

In the first positive electrode current collector 6a, a side wall 6h, which is a boundary between the thin portion 6f and a portion having an ordinary thickness, preferably inclines at more than 90 degrees with respect to the thin portion 6f.

Here, a method for operating the current interrupting mechanism 60 will be described. The deformation plate 62 deforms such that the central part of the deformation plate 62 moves toward the sealing plate 2 in response to an increase in the internal pressure of the battery case 100. When the internal pressure of the battery case 100 reaches a predetermined value or higher, the first positive electrode current collector 6a fractures at the notch 6g in the thin portion 6f upon the deformation of the deformation plate 62. The fracture causes disconnection of the conduction path from the positive electrode plate 4 to the positive electrode terminal 7. Accordingly, the current interrupting mechanism 60 includes the first positive electrode current collector 6a, the deformation plate 62, and the conductive member 61. When the prismatic secondary battery 20 is overcharged to increase the internal pressure of the battery case 100, the current interrupting mechanism 60 operates and disconnects the conduction path from the positive electrode plate 4 to the positive electrode terminal 7, which inhibits further overcharging. The operating pressure at which the current interrupting mechanism 60 operates can be set appropriately.

The pressure of lithium carbonate in the positive electrode active material mixture layer 4b causes decomposition of lithium carbonate and instant generation of gas when the prismatic secondary battery 20 is overcharged. Thus, the current interrupting mechanism 60 can operate more efficiently. The presence of lithium phosphate in the positive electrode active material mixture layer 4b can suppress an unintended chemical reaction that occurs when the prismatic secondary battery 20 is overcharged. This results in high reliability.

Before or after the deformation plate 62 is weld-connected to the first positive electrode current collector 6a, the leak inspection on the weld between the conductive member 61 and the deformation plate 62 is carried out by supplying gas to the inside of the conductive member 61 through a terminal through-hole 7d formed in the positive electrode terminal 7. The terminal through-hole 7d is sealed with a terminal sealing member 7x. The terminal sealing member 7x preferably includes a rubber member and a metal member on the outer surface of the rubber member.

Attachment of Components to Sealing Plate (Negative Electrode Side)

A method for attaching the negative electrode terminal 9 and the first negative electrode current collector 8a to the sealing plate 2 will be described by way of FIG. 11. The external insulating member 13 is disposed on the battery outer surface side adjacent to a negative electrode terminal attachment hole 2b in the sealing plate 2. An internal insulating member 12 and the first negative electrode current collector 8a are disposed on the battery inner surface side adjacent to the negative electrode terminal attachment hole 2b. Next, the negative electrode terminal 9 is inserted into the through-hole of the external insulating member 13, the negative electrode terminal attachment hole 2b of the sealing plate 2, the through-hole of the internal insulating member 12, and the through-hole of the first negative electrode current collector 8a. The end of the negative electrode terminal 9 is crimped onto the first negative electrode current collector 8a. The external insulating member 13, the sealing plate 2, the internal insulating member 12, and the first negative electrode current collector 8a are fixed accordingly. The crimped portion of the negative electrode terminal 9 is preferably weld-connected to the first negative electrode current collector 8a by means of laser welding or the like.

The internal insulating member 12 and the external insulating member 13 are preferably each made of resin.

Connection Between Current Collector and Tab

Figure 12:
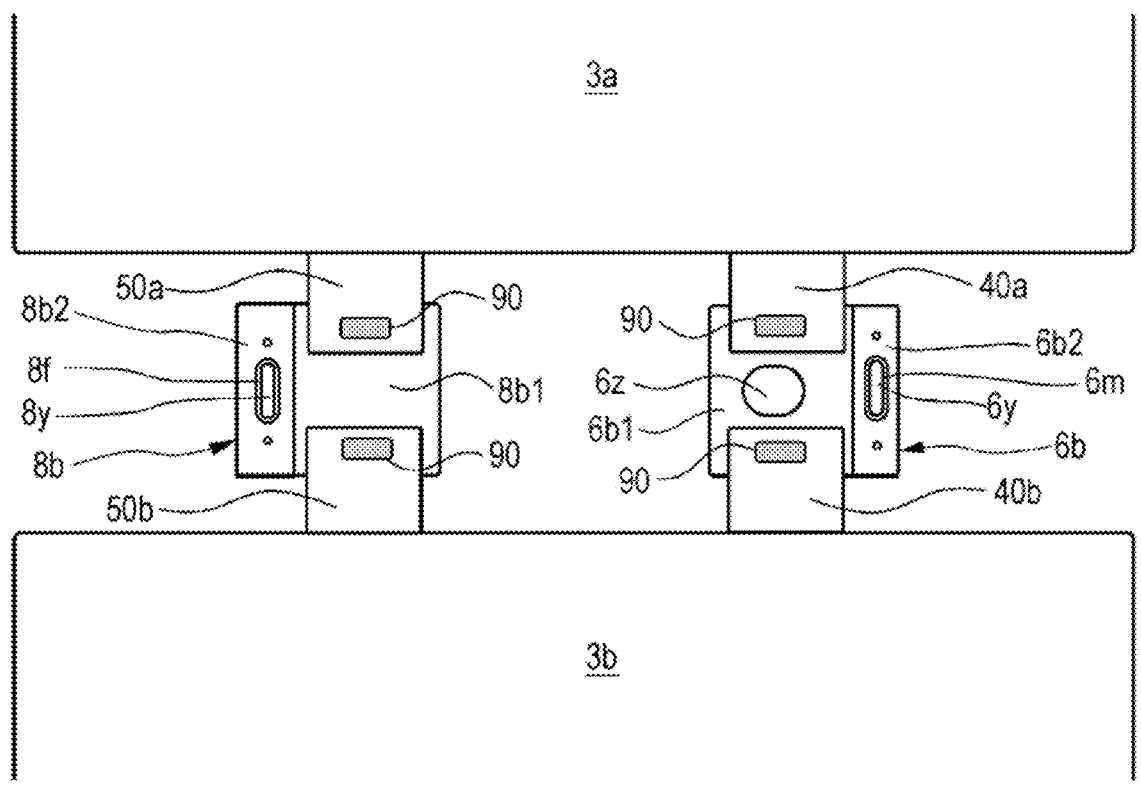
FIG. 12 is a view of the state where positive electrode tab groups are connected to a second positive electrode current collector and negative electrode tab groups are connected to a second negative electrode current collector.

FIG. 12 is a view of the state where the first positive electrode tab group 40a and the second positive electrode tab group 40b are connected to the second positive electrode current collector 6b, and the first negative electrode tab group 50a and the second negative electrode tab group 50b are connected to the second negative electrode current collector 8b.

Two electrode body elements are produced by using the above-described method and defined as a first electrode body element 3a and a second electrode body element 3b, respectively. The first electrode body element 3a and the second electrode body element 3b may have the completely same structure or may have different structures. Plural positive electrode tabs 40 of the first electrode body element 3a constitute the first positive electrode tab group 40a. Plural negative electrode tabs 50 of the first electrode body element 3a constitute the first negative electrode tab group 50a. Plural positive electrode tabs 40 of the second electrode body element 3b constitute the second positive electrode tab group 40b. Plural negative electrode tabs 50 of the second electrode body element 3b constitute the second negative electrode tab group 50b.

The second positive electrode current collector 6b and the second negative electrode current collector 8b are disposed between the first electrode body element 3a and the second electrode body element 3b. The first positive electrode tab group 40a and the second positive electrode tab group 40b are disposed on the second positive electrode current collector 6b. The first negative electrode tab group 50a and the second negative electrode tab group 50b are disposed on the second negative electrode current collector 8b. The first positive electrode tab group 40a and the second positive electrode tab group 40b are weld-connected to the second positive electrode current collector 6b to form welds 90. The first negative electrode tab group 50a and the second negative electrode tab group 50b are weld-connected to the second negative electrode current collector 8b to form welds 90. The welding method is preferably ultrasonic welding or resistance welding. Laser welding may be used for connection.

As illustrated in FIG. 12, the second positive electrode current collector 6b has a current collector first region 6b1 and a current collector second region 6b2. The positive electrode tabs 40 (the first positive electrode tab group 40a, the second positive electrode tab group 40b) are connected to the current collector first region 6b1. The current collector second opening 6z is formed in the current collector first region 6b1. The current collector first region 6b1 and the current collector second region 6b2 are connected to each other with a current collector third region 6b3 interposed therebetween. After the second positive electrode current collector 6b is connected to the first positive electrode current collector 6a, the current collector second opening 6z is placed at a position corresponding to the electrolyte injection port 15 provided in the sealing plate 2. The current collector second region 6b2 has a current collector first opening 6y. A current collector first recess 6m is provided around the current collector first opening 6y.

As illustrated in FIG. 12, the second negative electrode current collector 8b has a current collector first region 8b1 and a current collector second region 8b2. The negative electrode tabs 50 (the first negative electrode tab group 50a, the second negative electrode tab group 50b) are connected to the current collector first region 8b1. The current collector second region 8b2 has a current collector first opening 8y. A current collector first recess 8f is provided around the current collector first opening 8y. The current collector first region 8b1 and the current collector second region 8b2 are connected to each other with a current collector third region 8b3 interposed therebetween.

Connection Between First Positive Electrode Current Collector and Second Positive Electrode Current Collector As illustrated in FIG. 7A, the second positive electrode current collector 6b is placed on the second insulating member 63 such that a current collector protrusion 6x of the first positive electrode current collector 6a is positioned in the current collector first opening 6y of the second positive electrode current collector 6b. The current collector protrusion 6x of the first positive electrode current collector 6a is welded to the periphery of the current collector first opening 6y of the second positive electrode current collector 6b by means of irradiation with an energy ray, such as a laser. The first positive electrode current collector 6a is connected to the second positive electrode current collector 6b accordingly. The first positive electrode current collector 6a is preferably weld-connected to the second positive electrode current collector 6b at the current collector first recess 6m.

As illustrated in FIG. 7A, in the direction perpendicular to the sealing plate 2, the distance between the sealing plate 2 and the current collector first region 6b1 is larger than the distance between the sealing plate 2 and the current collector second region 6b2. Such a configuration results in a small space occupied by a current collecting part and provides a prismatic secondary battery with a high volumetric energy density.

During welding between the first positive electrode current collector 6a and the second positive electrode current collector 6b by means of irradiation with an energy ray, such as a laser, a target hole in the second positive electrode current collector 6b is preferably used as a target for image correction.

As illustrated in FIG. 7A, a current collector second recess 6w is formed on the surface of the first positive electrode current collector 6a that faces the second insulating member 63 and that is located on the back side of the current collector protrusion 6x. This configuration is preferred because it is easy to form a large weld between the first positive electrode current collector 6a and the second positive electrode current collector 6b. The formation of the current collector second recess 6w can protect the second insulating member 63 from damage caused by welding heat during weld connection between the first positive electrode current collector 6a and the second positive electrode current collector 6b.

Figure 11:
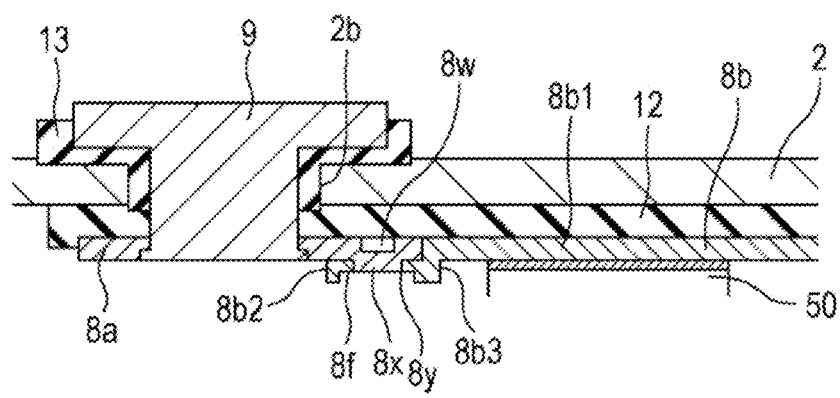
FIG. 11 is a sectional view at and near a negative electrode terminal in the longitudinal direction of the sealing plate.

Connection Between First Negative Electrode Current Collector and Second Negative Electrode Current Collector As illustrated in FIG. 11, the second negative electrode current collector 8b has the current collector first region 8b1 and the current collector second region 8b2. The negative electrode tabs 50 (the first negative electrode tab group 50a and the second negative electrode tab group 50b) are connected to the current collector first region 8b1. The current collector second region 8b2 has the current collector first opening 8y. The current collector first region 8b1 and the current collector second region 8b2 are connected to each other with the current collector third region 8b3 interposed therebetween.

As illustrated in FIG. 13, the second negative electrode current collector 8b is placed on the internal insulating member 12 such that a current collector protrusion 8x of the first negative electrode current collector 8a is positioned in the current collector first opening 8y of the second negative electrode current collector 8b. The current collector protrusion 8x of the first negative electrode current collector 8a is welded to the periphery of the current collector first opening 8y of the second negative electrode current collector 8b by means of irradiation with an energy ray, such as a laser. The first negative electrode current collector 8a is connected to the second negative electrode current collector 8b accordingly. The first negative electrode current collector 8a is preferably weld-connected to the second negative electrode current collector 8b at the current collector first recess 8f. In the direction perpendicular to the sealing plate 2, the distance between the sealing plate 2 and the current collector first region 8b1 is smaller than the distance between the sealing plate 2 and the current collector second region 8b2. The second negative electrode current collector 8b can be connected to the negative electrode terminal 9 without using the first negative electrode current collector 8a.

As illustrated in FIG. 11, a current collector second recess 8w is formed on the surface of the first negative electrode current collector 8a that faces the internal insulating member 12 and that is located on the back side of the current collector protrusion 8x. This configuration is preferred because it is easy to form a large weld between the first negative electrode current collector 8a and the second negative electrode current collector 8b. The formation of the current collector second recess 8w can protect the internal insulating member 12 from damage caused by welding heat during weld connection between the first negative electrode current collector 8a and the second negative electrode current collector 8b.

The current collector protrusion 6x and the current collector protrusion 8x preferably have a non-perfect circular shape in a plan view, and preferably have a rectangular shape, an elliptical shape, or a track shape in a plan view.

Attachment of Cover Member

Figure 13A:
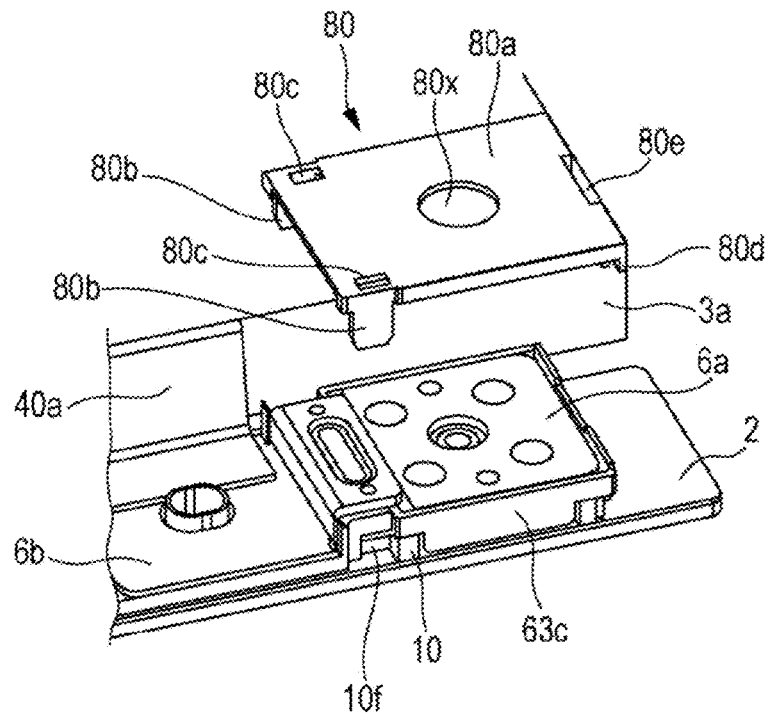
FIG. 13A is a view of the state before a cover member is attached to a first insulating member and a second insulating member.
Figure 13B:
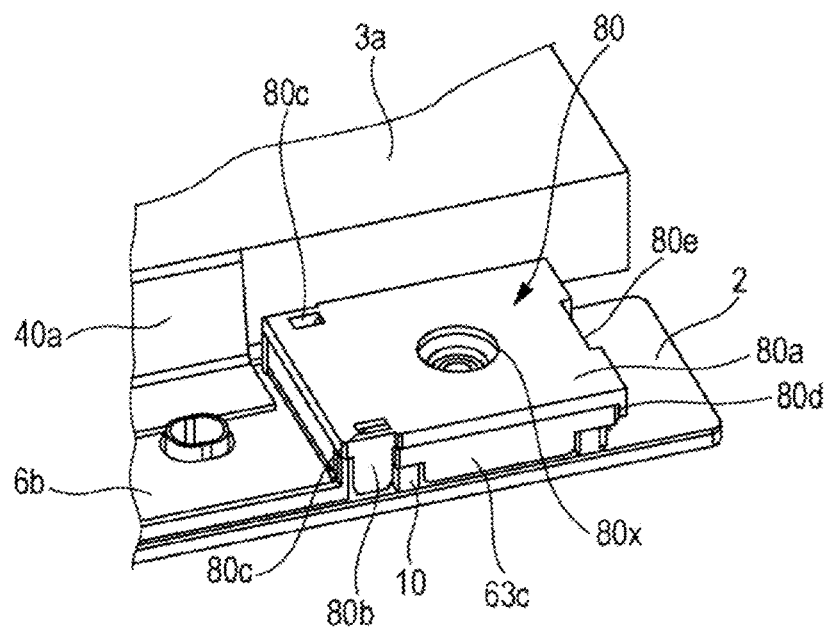
FIG. 13B is a view of the state after the cover member is attached to the first insulating member and the second insulating member.

FIG. 13A is a view of the state before the cover member 80 is attached to the first insulating member 10 and the second insulating member 63. FIG. 13B is a view of the state after the cover member 80 is attached to the first insulating member 10 and the second insulating member 63. In FIG. 13A and FIG. 13B, the second electrode body element 3b and the second positive electrode tab group 40b are not illustrated.

The cover member 80 has a cover body 80a and a pair of arms 80b. The cover body 80a is disposed to face the first positive electrode current collector 6a. The pair of arms 80b extend toward the sealing plate 2 from the opposed edges of the cover body 80a in the transverse direction of the sealing plate 2. The cover member 80 has a cover wall 80d, which extends toward the sealing plate 2 from the edge of the cover body 80a in the longitudinal direction of the sealing plate 2. A connection protrusion (not illustrated) is disposed on the inner surface of each arm 80b. The cover body 80a has base openings 80c near the base of the arms 80b. The cover wall 80d has a wall opening 80e.

The cover member 80 is connected to the first insulating member 10 and the second insulating member 63 such that the cover body 80a of the cover member 80 faces the first positive electrode current collector 6a. The arms 80b in a pair in the cover member 80 are respectively connected to the second connection parts 10f of the first insulating member 10 at the respective connection protrusions. The cover wall 80d of the cover member 80 is connected to the third connection part 63d of the second insulating member 63.

The third connection part 63d is a protrusion formed on the third wall 63b, and the third connection part 63d is fitted into the wall opening 80e of the cover wall 80d, whereby the first insulating member 10 is connected to the cover member 80. The connection is achieved by hooking the connection protrusion at the arm 80b of the cover member 80 to the second connection part 10f of the first insulating member 10. The cover body 80a has a cover opening 80x. The cover opening 80x is formed at a position opposed to the connection part between the deformation plate 62 and the first positive electrode current collector 6a. With such a configuration, the cover opening 80x functions as gas flow path, and the current interrupting mechanism operates smoothly.

The cover member 80 between the current interrupting mechanism 60 and the electrode body 3 allows the electrode body 3 to move in the battery case 100 and avoids damage to the current interrupting mechanism 60. The cover member 80 is preferably made of resin. The cover member 80 is preferably made of an insulating material.

A gap is preferably formed between the first positive electrode current collector 6a and the upper surface of the cover body 80a of the cover member 80. With such a configuration, gas smoothly flows under the lower surface of the deformation plate 62, and the deformation plate 62 thus deforms smoothly when the internal pressure of the battery case 100 reaches a predetermined value or higher. However, the gap is not necessarily formed.

The cover body 80a of the cover member 80 preferably has the base opening 80c. With such a configuration, gas smoothly flows under the lower surface of the deformation plate 62, and the deformation plate 62 thus deforms smoothly when the internal pressure of the battery case 100 reaches a predetermined value or higher. However, the base opening 80c is not necessarily formed.

Preferably, the cover member 80 is connected to at least one of the first insulating member 10 and the second insulating member 63 after the second positive electrode current collector 6b to which the positive electrode tab 40 has been connected is connected to the first positive electrode current collector 6a connected to the deformation plate 62.

Production of Electrode Body

The first positive electrode tab group 40a, the second positive electrode tab group 40b, the first negative electrode tab group 50a, and the second negative electrode tab group 50b are bent such that the upper surface of the first electrode body element 3a and the upper surface of the second electrode body element 3b in FIG. 12 comes into contact with each other directly or through another member. Accordingly, the first electrode body element 3a and the second electrode body element 3b are combined together into one electrode body 3. Preferably, the first electrode body element 3a and the second electrode body element 3b are combined together with a tape or the like. Alternatively, the first electrode body element 3a and the second electrode body element 3b are preferably combined together by placing them in a box-shaped or bag-shaped insulating sheet 14.

Assembly of Prismatic Secondary Battery

The electrode body 3 attached to the sealing plate 2 is covered with the insulating sheet 14 and inserted into the prismatic outer body 1. The insulating sheet 14 is preferably bent in a box shape or a bag shape. The opening of the prismatic outer body 1 is closed by joining the sealing plate 2 and the prismatic outer body 1 by means of laser welding or the like. Subsequently, a non-aqueous electrolyte containing an electrolyte solvent and an electrolyte salt is injected through the electrolyte injection port 15 provided in the sealing plate 2. The electrolyte injection port 15 is sealed with the sealing plug 16. The prismatic secondary battery 20 is produced accordingly.

Prismatic Secondary Battery 20

In the prismatic secondary battery 20, the provision of the through-hole 6c near a portion of the first positive electrode current collector 6a connected to the deformation plate 62 increases and stabilizes the flatness of the surface of the first positive electrode current collector 6a connected to the deformation plate 62. It is thus difficult to generate a gap during welding between the deformation plate 62 and the first positive electrode current collector 6a, and a reliable weld 70 is stably formed between the deformation plate 62 and the first positive electrode current collector 6a accordingly. Penetration welding can be stably carried out by welding, to the deformation plate 62, a portion of the first positive electrode current collector 6a distant from the through-hole 6c provided in the first positive electrode current collector 6a. This provides a reliable secondary battery.

In the radial direction of the deformation plate 62, the distance between the weld 70 and the periphery of the through-hole 6c of the first positive electrode current collector 6a is preferably 0.1 mm to 3 mm, more preferably 0.1 mm to 2 mm, and still more preferably 0.2 mm to 0.5 mm.

In the prismatic secondary battery 20, the weld 70 penetrates the first positive electrode current collector 6a and is connected to the deformation plate 62. The weld 70 does not penetrate the deformation plate. Such a configuration can assuredly avoid generation of a leaking portion in the deformation plate 62. As a result, the sealability of the secondary battery can be ensured certainly.

In the prismatic secondary battery 20, the deformation plate 62 has the thick portion 62a, which has a larger thickness than the surrounding area, in a central part. The first positive electrode current collector 6a is weld-connected to the thick portion 62a to form the weld 70. Such a configuration can effectively avoid formation of the weld 70 in the entire region in the thickness direction of the deformation plate 62. This provides a reliable secondary battery with certainly ensured sealability.

In the prismatic secondary battery 20, the deformation plate 62 has the protrusion 62b, which protrudes toward the electrode body 3, in a central part, and the thick portion 62a includes the protrusion 62b. With such a configuration, the first positive electrode current collector 6a is in close contact with the deformation plate 62 certainly during welding between the first positive electrode current collector 6a and the deformation plate 62. This provides a secondary battery having a reliable weld 70.

As the weld 70 is viewed in the direction perpendicular to the deformation plate 62 in the prismatic secondary battery 20, the weld 70 has a substantially annular shape. The weld 70 having a substantially annular shape is located so as to surround the through-hole 6c. Such a configuration provides a reliable secondary battery in which the first positive electrode current collector 6a and the deformation plate 62 are strongly connected to each other. When the internal pressure of the battery case 100 increases and the deformation plate 62 deforms upon application of the pressure on the deformation plate 62, the stress can assuredly act on a fracture-expected part (fragile part) provided in the first positive electrode current collector 6a.

Here, the substantially annular shape includes an annular shape and a partially cut annular shape. For example, the annular shape may be an annular shape with a cut or an annular shape with cuts. Provided that the length of the perimeter of the annular shape is 100, the total length of parts that are not cut out is preferably 70 or more, more preferably 80 or more, and still more preferably 90 or more.

In the prismatic secondary battery 20, the weld 70 having a substantially annular shape includes two substantially annular welds that are adjacent in the radial direction of the deformation plate 62. Such a configuration provides a reliable secondary battery in which the first positive electrode current collector 6a and the deformation plate 62 are strongly connected to each other. When the weld 70 includes two substantially annular welds, the substantially annular welds may be in contact with each other or may be distant from each other. The weld 70 may include three or more substantially annular welds.

The weld 70 may be composed of plural weld spots formed by using a pulsed laser. Plural weld spots may be connected to one another in a line. The weld 70 may be formed in a line by using a continuous wave laser.

In the prismatic secondary battery 20, the weld 70 may have a zig-zag pattern as viewed in the direction perpendicular to the deformation plate 62. Such a configuration provides a reliable secondary battery in which the first positive electrode current collector 6a and the deformation plate 62 are strongly connected to each other.

In the prismatic secondary battery 20, the deformation plate 62 has an annular first groove 62c on its surface adjacent to the electrode body 3 and an annular second groove 62d on its surface adjacent to the positive electrode terminal 7. In the radial direction of the deformation plate 62, at least part of the first groove 62c is located radially outward of the second groove 62d. Moreover, in the radial direction of the deformation plate 62, the width W2 of the second groove 62d is larger than the width W1 of the first groove 62c. Such a configuration can suppress an increase in the electrical resistance of the deformation plate 62 and enables the deformation plate 62 to deform easily. This provides a secondary battery having a low internal resistance and including a current interrupting mechanism that operates immediately when the secondary battery is overcharged.

The depth of the first groove 62c is preferably larger than the depth of the second groove 62d. Such a configuration enables the deformation plate 62 to deform easily. When the first groove 62c, which has a larger depth, is located radially outward of the second groove 62d, it is possible to suppress an increase in the electrical resistance of the deformation plate 62.

The first groove 62c includes a bottom 62c1, a first side wall 62c2, and a second side wall 62c3. The first side wall 62c2 is located nearer to the center of the deformation plate 62 than the second side wall 62c3. The angle of the second side wall 62c3 to the bottom 62c1 is preferably larger than the angle of the first side wall 62c2 to the bottom 62c1. Such a configuration can reduce process variations in the deformation plate 62 and stabilizes ease of deformation of the deformation plate 62. The current interrupting mechanism 60 assuredly operates at a predetermined pressure.

The thick portion 62a has a first flat surface 62x adjacent to the electrode body 3. The deformation plate 62 has a second flat surface 62y on the back side of the first groove 62c, the second flat surface 62y being a surface adjacent to the positive electrode terminal 7. The deformation plate 62 has a third flat surface 62z on the back side of the first flat surface 62x, the third flat surface 62z being a surface adjacent to the positive electrode terminal 7. In the thickness direction of the deformation plate 62, the distance between the first flat surface 62x and the second flat surface 62y is preferably 0.7 to 1.2 times the thickness of the thick portion 62a (the distance between the first flat surface 62x and the third flat surface 62z in the thickness direction of the deformation plate 62). This configuration can ensure a large distance between the deformation plate 62 and the first positive electrode current collector 6a after operation of the current interrupting mechanism 60. As a result, generation of sparks or the electrical continuity between the deformation plate 62 and the first positive electrode current collector 6a for the second time can be avoided assuredly. When the distance between the first flat surface 62x and the second flat surface 62y is 0.7 or more times the thickness of the thick portion 62a in the thickness direction of the deformation plate 62, a large distance between the deformation plate 62 and the first positive electrode current collector 6a after operation of the current interrupting mechanism 60 can be ensured. When the distance between the first flat surface 62x and the second flat surface 62y is 1.2 or less times the thickness of the thick portion 62a in the thickness direction of the deformation plate 62, the deformation plate 62 deforms smoothly.

The deformation plate 62 preferably has the tapered portion 62e at its periphery that is an edge adjacent to the positive electrode terminal 7. Such a configuration can effectively avoid damage to the conductive member 61 when the deformation plate 62 is inserted into the conductive member opening 61d of the conductive member 61.

As illustrated in FIG. 7B, the sealing plate 2 has an inner surface-side protrusion 2c, which has an annular shape in a plan view, around the positive electrode terminal attachment hole 2a and on the surface adjacent to the electrode body 3. When the first insulating member 10 pressed by the inner surface-side protrusion 2c deforms so as to escape in the horizontal direction (the direction parallel to the sealing plate 2, that is, the left-right direction in FIG. 7B), there is a possibility that the first insulating member 10 is distorted to generate a gap between the sealing plate 2 and the first insulating member 10 or between the first insulating member 10 and the conductive member 61. Such an issue can be solved by providing a groove in a region of the first insulating member 10 that is located between the sealing plate 2 and the conductive member 61 and outward of the inner surface-side protrusion 2c in the radial direction of a second terminal insertion hole 10d of the first insulating member 10. For example, the first insulating member 10 preferably has the insulating member first groove 10x on the surface that faces the sealing plate 2. In addition to the insulating member first groove 10x or instead of the insulating member first groove 10x, the first insulating member 10 preferably has an insulating member second groove 10y on the surface that faces the conductive member 61. The first insulating member 10 may have any one of the insulating member first groove 10x and the insulating member second groove 10y. The first insulating member 10 may have the insulating member second groove 10y on the surface that faces the sealing plate 2 and the insulating member first groove 10x on the surface that faces the conductive member 61. The insulating member first groove 10x and the insulating member second groove 10y are not essential structures. The sealing plate 2 has an outer surface-side protrusion 2d, which has an annular shape in a plan view, at the periphery of the positive electrode terminal attachment hole 2a and on the outer surface of the sealing plate 2.

The insulating member first groove 10x preferably has an annular shape in a plan view. The insulating member second groove 10y preferably has an annular shape in a plan view. The insulating member first groove 10x and the insulating member second groove 10y do not necessarily have an annular shape in a plan view and may have a partially missing annular shape. For example, the length of the insulating member first groove 10*x* or the insulating member second groove 10*y* may be 70% or more of the length of the perimeter of the annular shape.

When the first insulating member 10 has a groove on each surface, one groove is preferably located outward of the other groove in the radial direction of the second terminal insertion hole 10*d* of the first insulating member 10.

It is very effective when the first insulating member 10 is relatively soft, in other words, when the first insulating member 10 is made of, for example, perfluoroalkoxy alkane (PFA), or polytetrafluoroethylene (PTFE).

As illustrated in FIG. 7A, the conductive member 61 preferably has a tapered portion 61*e* at the edge of the through-hole in the conductive member 61, the edge being located adjacent to the electrode body 3. Such a configuration makes it difficult to generate a gap between the positive electrode terminal 7 and the conductive member 61 and effectively inhibits gas from passing through between the positive electrode terminal 7 and the conductive member 61.

FIGS. 14A to 14F are plan views illustrating the shapes of the welds 70 between the first positive electrode current collector 6*a* and the deformation plate 62 in the embodiment and other embodiments.

Figure 14A:
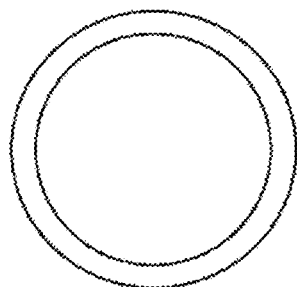
FIGS. 14A to 14F are views illustrating the shapes of welds in other embodiments.

FIG. 14A is a plan view illustrating the shape of the weld 70 of the prismatic secondary battery 20 according to the embodiment.

Figure 14B:
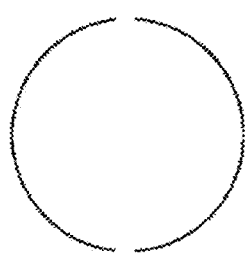
Figure 14C:
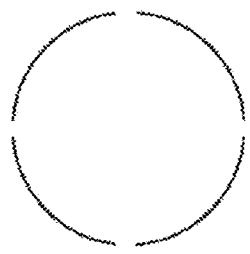

As illustrated in FIGS. 14B and 14C, the weld 70 may have a partially cut annular shape.

Figure 14D:
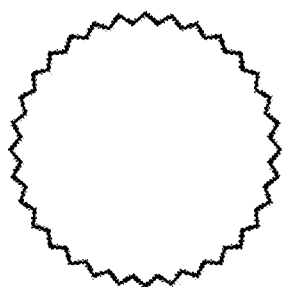

As illustrated in FIG. 14D, the weld 70 may have a zig-zag pattern.

Figure 14E:
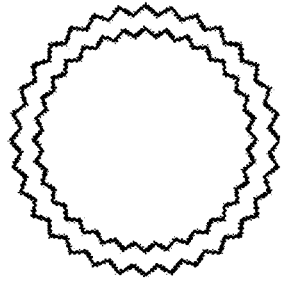

As illustrated in FIG. 14E, the weld 70 may have a shape composed of two zig-zag annular welds.

Figure 14F:
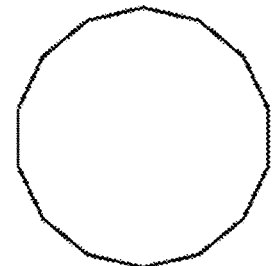

As illustrated in FIG. 14F, the weld 70 may have a polygonal shape.

Others

The above-described embodiment is an example where the first insulating member disposed between the sealing plate and the conductive member and the second insulating member disposed between the deformation plate and the first positive electrode current collector of the positive electrode current collector are used. In a modification, the positive electrode current collector and the first insulating member disposed between the sealing plate and the conductive member can be fixed to each other without using the second insulating member.

The above-described embodiment is an example where the positive electrode terminal and the conductive member are separate components. However, the positive electrode terminal and the conductive member may be integrally formed as one component. In the component composed of the positive electrode terminal and the conductive member in this case, a part serving as a positive electrode terminal may be inserted into the positive electrode terminal attachment hole of the sealing plate from the battery inner side and crimped on the battery outer side.

The first insulating member, the second insulating member, and the cover member are preferably made of resin, for example, polypropylene, polyethylene, perfluoroalkoxy alkane (PFA), polytetrafluoroethylene (PTFE), or ethylenetetrafluoroethylene copolymer (ETFE).

The embodiment is an example where the electrode body 3 is composed of two electrode body elements but is not limited to this example. The electrode body 3 may be composed of three or more electrode body elements. The electrode body elements do not necessarily form a stacked electrode body and may form a wound electrode body in which a long positive electrode plate and a long negative electrode plate are wound with a separator interposed therebetween.

The electrode body 3 may be a stacked electrode body. The electrode body 3 may be a wound electrode body in which a long positive electrode plate and a long negative electrode plate are wound with a separator interposed therebetween.

The embodiment is an example where a member that electrically connects the positive electrode plate and the deformation plate is composed of the first positive electrode current collector and the second positive electrode current collector. The member that electrically connects the positive electrode plate and the deformation plate, however, may be composed of one positive electrode current collector.

The energy ray used for welding may be, for example, a laser, an electron beam, or an ion beam While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   an electrode body including a positive electrode plate and a negative electrode plate;
   a battery case containing the electrode body;
   a terminal attached to the battery case;
   a conductive member having an opening adjacent to the electrode body;
   a deformation plate that seals the opening, and a current collector;
   wherein
   the positive electrode plate or the negative electrode plate is electrically connected to the terminal via the current collector,
   the deformation plate, and the conductive member,
   the current collector has a through-hole,
   the deformation plate is disposed to face the through-hole,
   the deformation plate comprises a central part which has a thick portion, which has a larger thickness than a surrounding area a portion of the current collector distant from the through-hole comprising a flat portion to be in direct contact with a flat portion of the deformation plate and is welded to the deformation plate to form a weld at the thick portion of the deformation plate,
   the weld penetrates the current collector and is connected to the deformation plate,
   the weld does not penetrate the entirety of the deformation plate,
   the weld has a substantially annular shape, when viewed in a direction perpendicular to the deformation plate,
   the weld having a substantially annular shape includes two substantially annular welds that are adjacent in a radial direction of the deformation plate and is located so as to surround the through-hole, and
   the deformation plate deforms when an internal pressure of the battery case reaches a predetermined value or higher, and the deformation of the deformation plate causes electrical disconnection between the positive electrode plate or the negative electrode plate and the terminal.

2. The secondary battery according to claim 1, wherein
the deformation plate has a protrusion, which protrudes toward the electrode body, in a central part, and
the thick portion includes the protrusion.

3. The secondary battery according to claim 1, wherein, as the weld is viewed in a direction perpendicular to the deformation plate, the weld has a zig-zag pattern.

4. The secondary battery according to claim 1, wherein
the deformation plate has an annular first groove on its surface adjacent to the electrode body and an annular second groove on its surface adjacent to the terminal,
in a radial direction of the deformation plate, at least part of the first groove is located outward of the second groove, and
in the radial direction of the deformation plate, a width of the second groove is larger than a width of the first groove.

5. The secondary battery according to claim 4, wherein a depth of the first groove is larger than a depth of the second groove.

6. The secondary battery according to claim 4, wherein
the first groove includes a bottom, a first side wall, and a second side wall,
the first side wall is located nearer to a center of the deformation plate than the second side wall, and
an angle of the second side wall to the bottom is larger than an angle of the first side wall to the bottom.

7. The secondary battery according to claim 1, wherein the deformation plate has a tapered portion at its periphery that is an edge adjacent to the terminal.

8. The secondary battery according to claim 1, wherein the terminal and the conductive member are integrally formed as one component.

* * * * *